G. W. SNOW.
TROLLEY RETRIEVING DEVICE.
APPLICATION FILED FEB. 2, 1909.
951,622.
Patented Mar. 8, 1910.
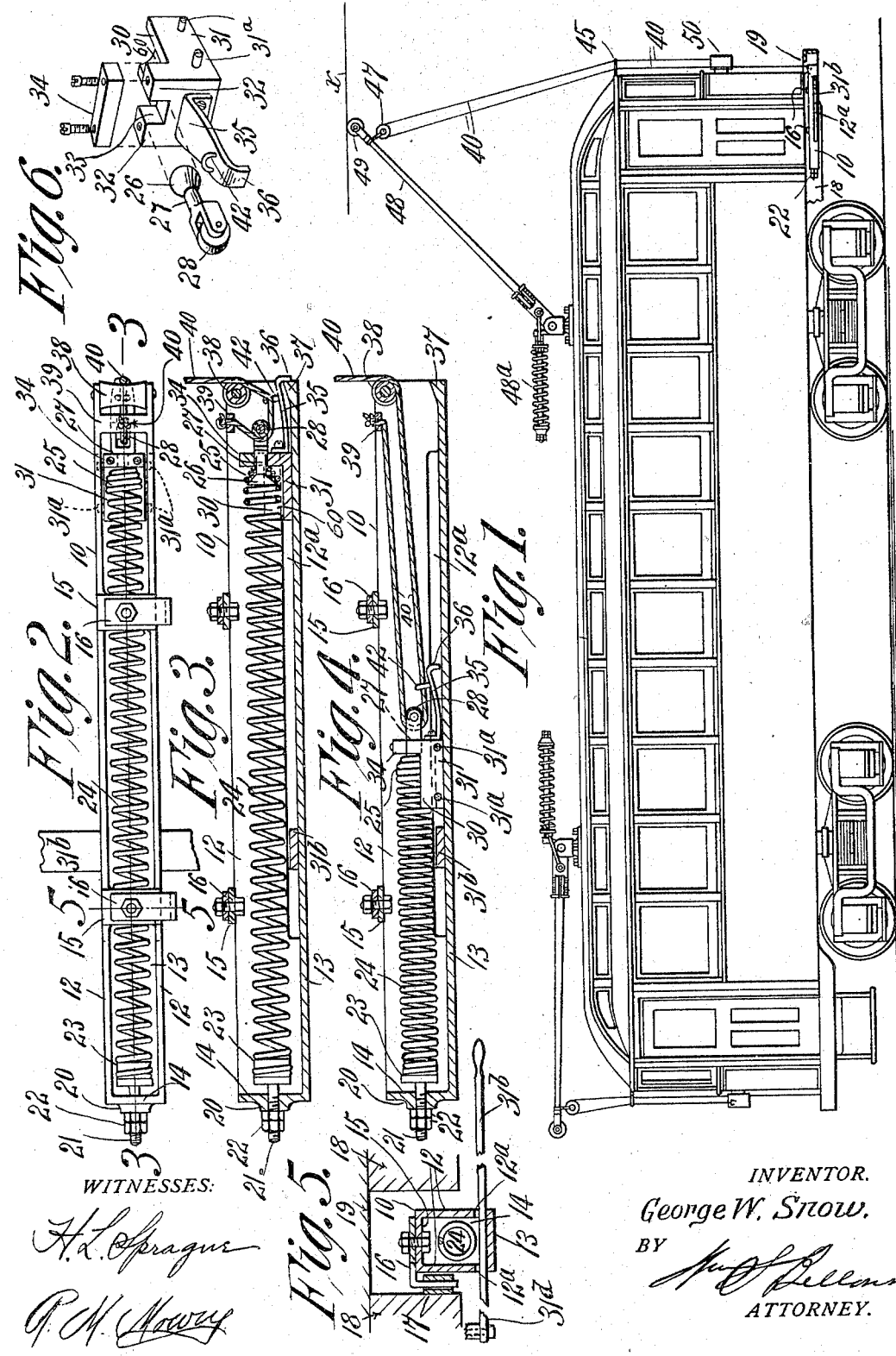
WITNESSES:
INVENTOR.
George W. Snow.
BY
ATTORNEY.

UNITED STATES PATENT OFFICE.

GEORGE W. SNOW, OF HOLYOKE, MASSACHUSETTS.

TROLLEY-RETRIEVING DEVICE.

951,622. Specification of Letters Patent. Patented Mar. 8, 1910.

Application filed February 2, 1909. Serial No. 475,561.

*To all whom it may concern:*

Be it known that I, GEORGE W. SNOW, a citizen of the United States of America, and resident of Holyoke, in the county of Hampden and State of Massachusetts, have invented certain new and useful Improvements in Trolley-Retrieving Devices, of which the following is a full, clear, and exact description.

This invention relates to improvements in a retriever operative, whenever the trolley wheel for an electric railway car becomes disengaged from the overhead wire and moves upwardly above the wire.

As well known, trolley catchers, so-called, are employed in conjunction with the trolley cords, the same having the action and effect, upon the disengagement of the trolley wheel from a trolley wire of checking the cord before the wheel has risen more than a few inches above the overhead wire,—it then becoming necessary for some person to draw, through means of the trolley cord, the trolley down to its proper position.

The present invention pertains to a device which is employed in conjunction with the ordinary trolley catcher and trolley cord and comprises a member which is subject to pressure from a suitable source of power, such as a spring, to which member a portion of the trolley cord has an engagement, the device including a catch or detent for the member which is actuated by the spring or other portion, normally restraining the latter from its retrieving movement on the trolley cord, but operative when such cord is placed under tension, as occasioned by the upward swinging movement of the trolley pole and wheel, to release the movable member whereby the therewith connected cord will be pulled upon so as to downwardly withdraw the trolley pole and wheel to a position below the overhead wire, preventing the pole or wheel from striking the transverse trolley wire supports.

The invention is exemplified in the accompanying drawings, described in conjunction therewith and set forth in the claims.

In the drawings:—Figure 1 is a side elevation of a double-truck electric street car, driven from over-head trolley, a portion of the draft-sill at one end thereof being broken away in section showing the retriever and its cord connection with the over-head trolley-pole; Fig. 2 is a plan view of the retriever, the position of the working parts being shown as set, and under spring tension; Fig. 3 is a side elevation, with some parts in section, of the retriever, the position of parts being the same as in Fig. 1; the plane of section being indicated by the line 3—3, Fig. 2; Fig. 4 is a sectional elevation similar to Fig. 3, but showing the actuating spring and coacting parts in the position they assume immediately following the displacement of the trolley wheel from the overhead trolley wire; Fig. 5 is a cross section of the retriever taken on line 5—5, Fig. 2; and Fig. 6 is a perspective view of the guide block and the latching and releasing mechanism of the retriever.

In the drawings, 10 is the retriever body or case, and consists in a trough-like metal box open at the top comprising the side walls 12, 12, the bottom wall 13, and one end wall 14. The top edges of the side walls 12, 12, are united or bridged across at proper places by the bars 15. These bars are preferably formed integral with the case 10, and are located thereon at distances from each end of the case, equal approximately to one third of the length of the said case.

Each bridge bar 15 has bolted thereto the horizontal member of a right angular shaped hook 16, the downturned vertical member of which is engaged by and supported in a socket 17 which is secured to the inner side of one of the draft-sills 18 of the car, the form of the hooks 16 and sockets 17 being such that the retriever 10 rigidly, though detachably, supported thereby, is positioned about centrally in the space between the two draft-sills 18 and under the car platform 19, as shown in Figs. 1 and 5.

The end wall 14 of the retriever case has formed exteriorly thereon a hub 20, through which is passed the anchor bolt 21, the outside protruding end portion of which is screw threaded and provided with the nuts 22. The other end portion of the bolt 21 which is within the retriever case has formed thereon the spirally grooved cylindrical anchor-head 23 to which is secured one end of the retriever spring 24.

The diameter of the spring holding bolt-head 23 is about that of the spring 24, and such head protrudes a short distance within the coils of the said spring, the spiral grooves on the head 23 receiving and securely anchoring the engaging end of the spring as shown in Figs. 2, 3 and 4.

The spring 24 has a length approximately one-half that of the retriever case 10, and such spring at its free end portion has the last few coils thereof so wound as to produce a conical extremity for the spring and to form a closed tapered socket therewithin.

The socket 25 on the free end of the spring 24 is adapted to receive and support therewithin the conical or tapered head 26 of the sheave carrying draft bolt 27. This bolt 27 extended beyond the apex of the conical head 26 is for a short distance of a reduced diameter equal to the end opening in the socket 25 of the spring 24, and has formed on its end, opposite the tapered head 26, a forked bearing for the cord sheave 28. This sheave 28 and its forked bearing is small enough to pass through the reduced opening in the socket portion of the spring 24 to the end that the practical assemblage of the parts constituting the anchorage end, and the draft end of the spring is provided for, and which in practice is as follows: The draft-bolt 27 is first inserted within the coils of the spring 24, with the sheave 28 ahead; it is then pushed through the entire length of the spring 24 until the surface of the tapered head 26 is seated within the tapered socket 25, and the bolt 27 and sheave 28 protruding therefrom. The spirally grooved head 23 of the anchor-bolt 21 is then screwed into engagement with the end coils at the anchorage end of the spring 24, after which the said spring, with its draft and anchor heads in place is placed within the retriever case 10.

The bolt portion 21 of the anchor head 23 is then passed through the hub 20 of the end wall 14, and secured thereto by the nuts 22.

A guide block 30, formed with a base portion 31 which is of a width about equal to the inside width of the retriever case, is slidably supported on the bottom wall 13 thereof. The upper face of the base portion of this block is recessed as indicated at 60 to receive the portion of the spring 24.

A front raised extension 32 of the guide block 30 is formed with a recess 33 therein which receives the reduced portion of the draft-bolt 27, which is secured there within by the screw fastened cap 34. The width of the recess 33 in the guide block is less than the width of the sheave bearing end of the draft bolt 27 which, when the cap 34 is screwed in place is thus securely locked to the guide block.

Projecting outwardly from each side of the base portion 31 of the guide block are short guide pins 31ª which project through and are guided in the long slots 12ª, 12ª formed in the side walls 12, 12, at the bottoms thereof.

A setting lever 31ᵇ extends horizontally through slots 12ª of the retriever case 10, in a direction transversely of the case and behind the guide block 30. One end of this lever is bolted to the underside of the car platform at 31ᵈ and constitutes the fulcrum therefor; the free end has a handle formed thereon by means of which the lever is operated manually to force the spring 24 by engagement with the block 30 to its set or latched position, seen in Figs. 2 and 3.

At a point on the end face of the guide block extension 32, and below the sheave 28 is secured the downwardly bent flange end of a latch spring 35. The other end of the said latch spring has formed thereon a downwardly bent hook 36 which is adapted to engage the slightly raised end portion 37 of the bottom wall 13 at the open end of the retriever case. A concave roller 38 is mounted adjacent the said open end of the retriever case at a point above the latch engaging end portion 37. A bridge bar 39 adjacent the roller sheave 38 is formed in the retriever case and extends across the top portion of the case between the walls 12, 12.

The rope or cord 40 connecting with the trolley pole 48 is secured by one end to the bridge-bar 39, as shown in Figs. 3 and 4, and extends from this point of attachment to and around the draft bolt sheave 28, and thence through a staple 42 secured to or formed on the latch spring 35 adjacent its hook or free end; the further course of the trolley cord from this point is upwardly to the concave roller sheave 38 which it engages, and from thence vertically up to the cord guides 45 on the end of the car roof, from which it passes in a course somewhat inclined from a vertical line to the sheave 47 on the upwardly spring-pressed trolley-pole 48. After passing over and around the said sheave 47 the course of the cord is downward at more or less of an incline and parallel to the upward course just described through the cord guide 45 from which guides it passes vertically down to the trolley-catcher 50, secured to the rear platform fender of the car.

The retriever, forming the subject of this invention as above described, is designed to be used in connection with any of the trolley catchers in common use, and to coact therewith in a manner shortly to be described.

The operation of the retriever is as follows: The trolley pole 48 being in its operative position with its trolley wheel 49 in connection with the overhead electric trolley wire x, the car conductor reaching under the car platform 19 grasps the setting-lever 31ᵇ and swinging it on its fulcrum 31ᵈ forces the guide block 30 with the attached spring 24 to the distended position of the latter, shown in Figs. 2 and 3, at which time the latch-hook 36 engages the raised case-end 37 and holds the distended and stretched spring in its set position. Simultaneously with the above described spring setting operation, the trolley-catcher 50 operates to take up all slackness of cord between it and the retriever, and while the car is running and while the trolley wheel 49 is in engagement with the trolley wire $x$ the said trolley catcher automatically maintains the cord 40 in a taut, but not a strained, condition; but in the event of the trolley wheel 49 being displaced, or accidentally "jumping" the trolley wire $x$, the trolley catcher 50 acts almost instantly to stop the violent movement of the trolley pole 48 upwardly impelled by its spring 48$^a$, but leaving it in its stopped position as held by such catcher 50 with the trolley wheel 49 in a position somewhat above the trolley wire $x$. This position of the trolley wheel above the wire $x$ if not instantly drawn below the said wire, is, with the car running under its unchecked impetus, a menace to the cross supporting wires which at distances not far apart extend from the trolley wire $x$ to supporting poles on either side of the track, but a complete avoidance of the above stated danger is provided by the instantaneous action of the retriever which is as follows:—The instant the trolley catcher 50 acts to stop the running out of cord 40 therefrom it brings a reaction on the other end of the cord which passes into the retriever case 10 through the staple 42 on the top of latch spring 35. A reference to Fig. 3 will show that the course of the cord 40 from the roller sheave 38 to the sheave 28 is bent downwardly at an angle to where it passes through the staple 42 to the very important end that the sudden pull exerted on retriever end of the cord, as above described, acts to draw the cord between the sheaves 38 and 28 to a straight line, and in so doing raises the latch spring 35 from its holding engagement with the case edge 37, resulting in the full retractile force of spring 24, causing the rapid drawing back of the sheave 28, to the position shown in Fig. 4, and thereby drawing back with it a double course of cord 40, and a corresponding downward hauling of the trolley pole 48 a distance sufficient to hold the trolley wheel 49 carried thereon, at a point below the wire $x$ and where there are no cross support wires to be endangered thereby.

The device including the components illustrated in Figs. 2 to 6 inclusive constitutes a mechanism which as an entirety is operative without necessarily having combined therewith a trolley catcher, for it may be understood that the trolley cord connected and engaged with the device as shown might, after engagement with the trolley pole, be engaged otherwise than with a trolley cord stop or catcher such as referred to, and indicated at the location 50, in which case, however, a slack in the cord would be left corresponding to the maximum, undulations, or variations in the height of the trolley wire; but, of course, the provision of the trolley stop or catcher, which has the well known function of normally operating as a slack absorber, is advantageous in conjunction with my present retriever in the manner substantially as shown.

I claim:—

1. In a trolley retrieving device, in combination, a support having a longitudinal slideway, a block slidable therein, a spring having by one end an engagement with said support and by its other an engagement with said block and a sheave appurtenant to said block, and another sheave appurtenant to said support adjacent the block, a detent carried by the block and engaging the support, a cord having engagement with a trolley pole, one end thereof being secured to said support, an intermediate portion thereof being looped around said first named sheave and thence passing with a bent course to a running engagement on the second named sheave and having an engagement, whereby the course thereof is normally bent, with said detent, and operative by an extraordinary draft thereon to straighten the line thereof between said sheaves for moving the detent to a releasing position whereby said block is liberated to the sliding action of said spring thereon for imparting a draft movement to said cord.

2. In a trolley retrieving device, in combination, a trough-shaped support having a portion to be engaged by a detent and having slotways at opposite sides thereof, a block slidable in said trough-shaped support, provided with oppositely extended studs engaged in said slotways, having in conjunction therewith a sheave and carrying a spring detent operative to engage said catch portion of the support, a spring having one end connected to the support and the other to said block, another sheave mounted on the end portion of the support, a trolley cord having an end thereof connected to the support having a bight thereof passed around the block carried sheave, thence passing to engagement in said spring detent and thence having a running engagement on the sheave in said support.

Signed by me at Springfield, Mass., in presence of two subscribing witnesses.

GEORGE W. SNOW.

Witnesses:
WM. S. BELLOWS,
G. R. DRISCOLL.